US008880402B2

(12) United States Patent
Wasson et al.

(10) Patent No.: US 8,880,402 B2
(45) Date of Patent: Nov. 4, 2014

(54) AUTOMATICALLY ADAPTING USER GUIDANCE IN AUTOMATED SPEECH RECOGNITION

(75) Inventors: Ryan J. Wasson, Grosse Pointe Park, MI (US); John P. Weiss, Shelby Township, MI (US); Jason W. Clark, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 1454 days.

(21) Appl. No.: 11/554,001

(22) Filed: Oct. 28, 2006

(65) Prior Publication Data

US 2008/0103781 A1    May 1, 2008

(51) Int. Cl.
*G10L 21/00* (2013.01)
*G10L 15/22* (2006.01)
*G10L 17/26* (2013.01)

(52) U.S. Cl.
CPC ............... *G10L 15/22* (2013.01); *G10L 17/26* (2013.01)
USPC ........ 704/270.1; 704/275; 704/246; 704/243; 704/256; 379/88.02; 379/67.1; 379/93.04

(58) Field of Classification Search
USPC ............. 704/270, 270.1, 275, 246, 231, 243, 704/256; 379/88.02, 88.01, 67.1, 88.22, 379/93.04, 93.03
See application file for complete search history.

(56) References Cited

U.S. PATENT DOCUMENTS

| 5,566,272 | A  | * | 10/1996 | Brems et al. | 704/231 |
|---|---|---|---|---|---|
| 5,721,827 | A  | * | 2/1998 | Logan et al. | 709/217 |
| 5,732,216 | A  | * | 3/1998 | Logan et al. | 709/203 |
| 6,084,168 | A  | * | 7/2000 | Sitrick | 84/477 R |
| 6,246,985 | B1 | * | 6/2001 | Kanevsky et al. | 704/270 |
| 6,356,868 | B1 | * | 3/2002 | Yuschik et al. | 704/246 |
| 6,442,519 | B1 | * | 8/2002 | Kanevsky et al. | 704/243 |
| 6,510,417 | B1 | * | 1/2003 | Woods et al. | 704/275 |
| 6,832,189 | B1 | * | 12/2004 | Kanevsky et al. | 704/235 |
| 7,110,525 | B1 | * | 9/2006 | Heller et al. | 379/265.11 |
| 2005/0055321 | A1 | * | 3/2005 | Fratkina et al. | 706/45 |
| 2007/0011008 | A1 | * | 1/2007 | Scarano et al. | 704/254 |
| 2009/0198357 | A1 | * | 8/2009 | Logan et al. | 700/94 |

* cited by examiner

*Primary Examiner* — Vijay B Chawan
(74) *Attorney, Agent, or Firm* — Anthony Luke Simon; Reising Ethington P.C.

(57) ABSTRACT

A speech recognition method includes receiving input speech from a user, processing the input speech to obtain at least one parameter value, and determining an experience level of the user using the parameter value(s). The method can also include prompting the user based upon the determined experience level of the user to assist the user in delivering speech commands.

26 Claims, 4 Drawing Sheets

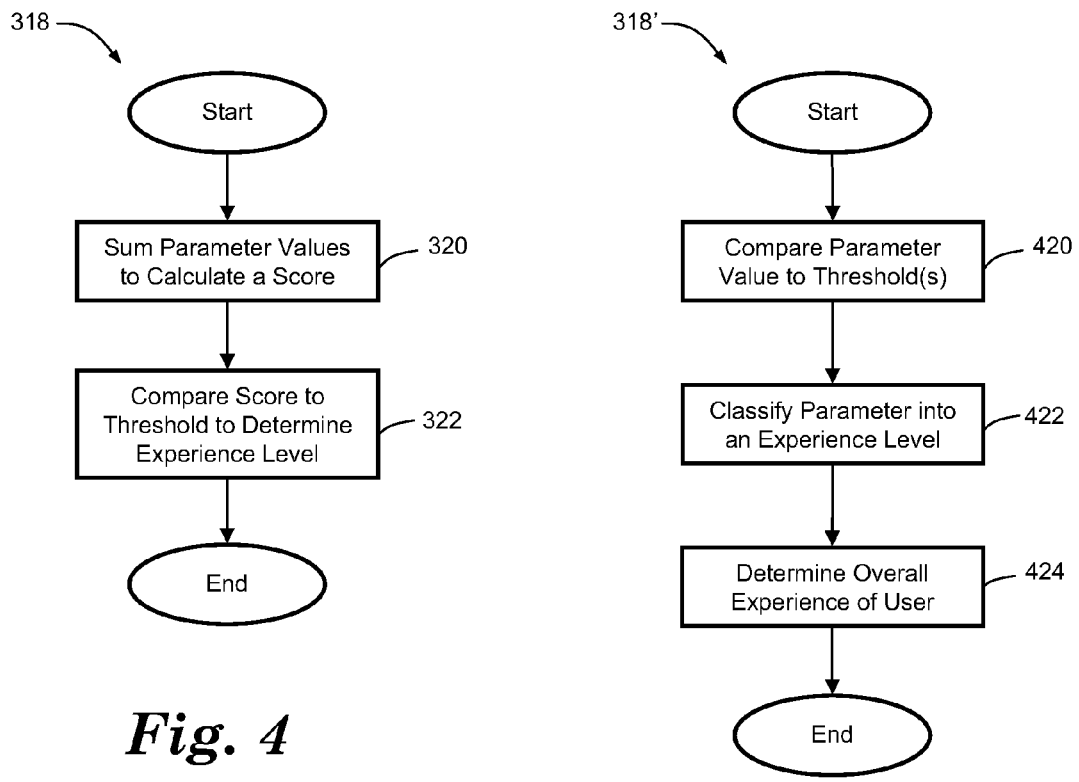
*Fig. 4*
*Fig. 5*
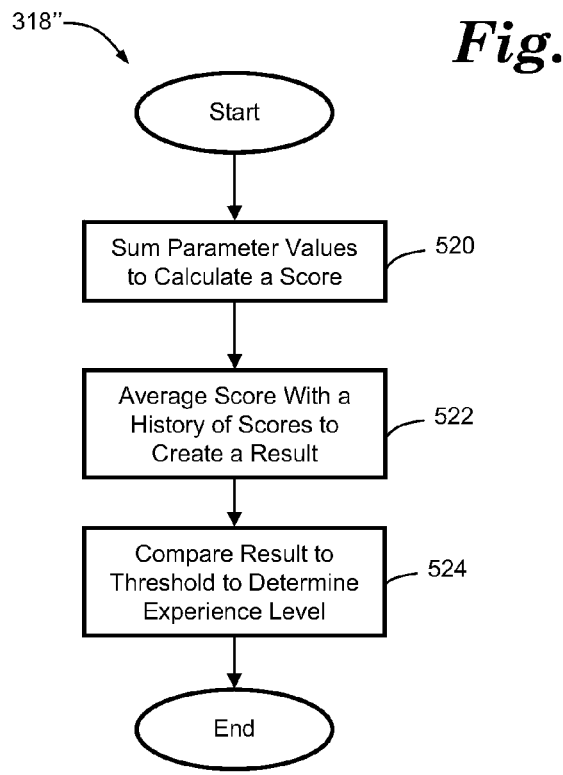
*Fig. 6*

AUTOMATICALLY ADAPTING USER GUIDANCE IN AUTOMATED SPEECH RECOGNITION

TECHNICAL FIELD

This invention relates to automated speech recognition (ASR) and, more particularly, to automated speech recognition with user guidance.

BACKGROUND OF THE INVENTION

ASR technologies enable microphone-equipped computing devices to interpret speech and thereby provide an alternative to conventional human-to-computer input devices such as keyboards or keypads. Many telecommunications devices are equipped with ASR technology to detect the presence of discrete speech such as a spoken nametag or control vocabulary like numerals, keywords, or commands. For example, ASR can match a spoken command word with a corresponding command stored in memory of the telecommunication device to carry out some action, like dialing a telephone number.

Some ASR systems provide assistance to the users to guide the user when using the system. Often, the user assistance can take the form of a tutorial to quickly provide users with an overview of the system. Tutorials do not, however, provide the user with guidance once the tutorial is completed. The ASR assistance can include user guidance to instruct users how to use the system or provide prompts to remind users how to complete commands. The assistance can range from simple instructions for using a command to more sophisticated interaction with the user. The user prompts can guide the user on how to format commands (e.g. "say the complete phone number") or provide the user with command options. Very detailed user guidance can slow the user's interaction with the ASR while minimal user guidance may not provide sufficient assistance to novice users. Some systems can enable users to turn the user guidance on or off, but the user must be familiar with how request it. Moreover, even if a user is familiar with turning the assistance on or off, the user may be very familiar with one or more sets of commands for the ASR, but can not be familiar at all with other commands.

SUMMARY OF THE INVENTION

According to one aspect of the present invention, there is provided a speech recognition method comprising the steps of: (a) receiving input speech from a user, (b) processing the input speech to obtain at least one parameter value, and (c) determining an experience level of the user using the parameter value(s).

According to another aspect of the present invention, the speech recognition method comprises the steps of: (a) receiving input speech from a user, (b) processing the input speech to determine an experience level of the user, and (c) prompting the user based upon the determined experience level to assist the user in delivering speech commands.

According to yet another aspect of the invention, there is provided a communications system located on a vehicle for providing automated speech recognition for acoustic data. The communications device comprises a speech receiving device, a memory, and a processor. The speech receiving device receives speech as acoustic data from a user. The memory stores the acoustic data. The processor processes the acoustic data to obtain at least one parameter value and determine an experience level of the user. The processor determines a prompt for the user based upon the determined experience level to assist the user in delivering speech commands to the system.

BRIEF DESCRIPTION OF THE DRAWINGS

Preferred exemplary embodiments of the invention will hereinafter be described in conjunction with the appended drawings, wherein like designations denote like elements, and wherein:

FIG. 4 is a flow chart of an embodiment of step 318 of FIG. 3;

FIG. 5 is a flow chart of another embodiment of step 318 of FIG. 3; and

FIG. 6 is a flow chart of yet another embodiment of step 318 of FIG. 3.

DETAILED DESCRIPTION OF THE PREFERRED EMBODIMENTS

Figure 1:
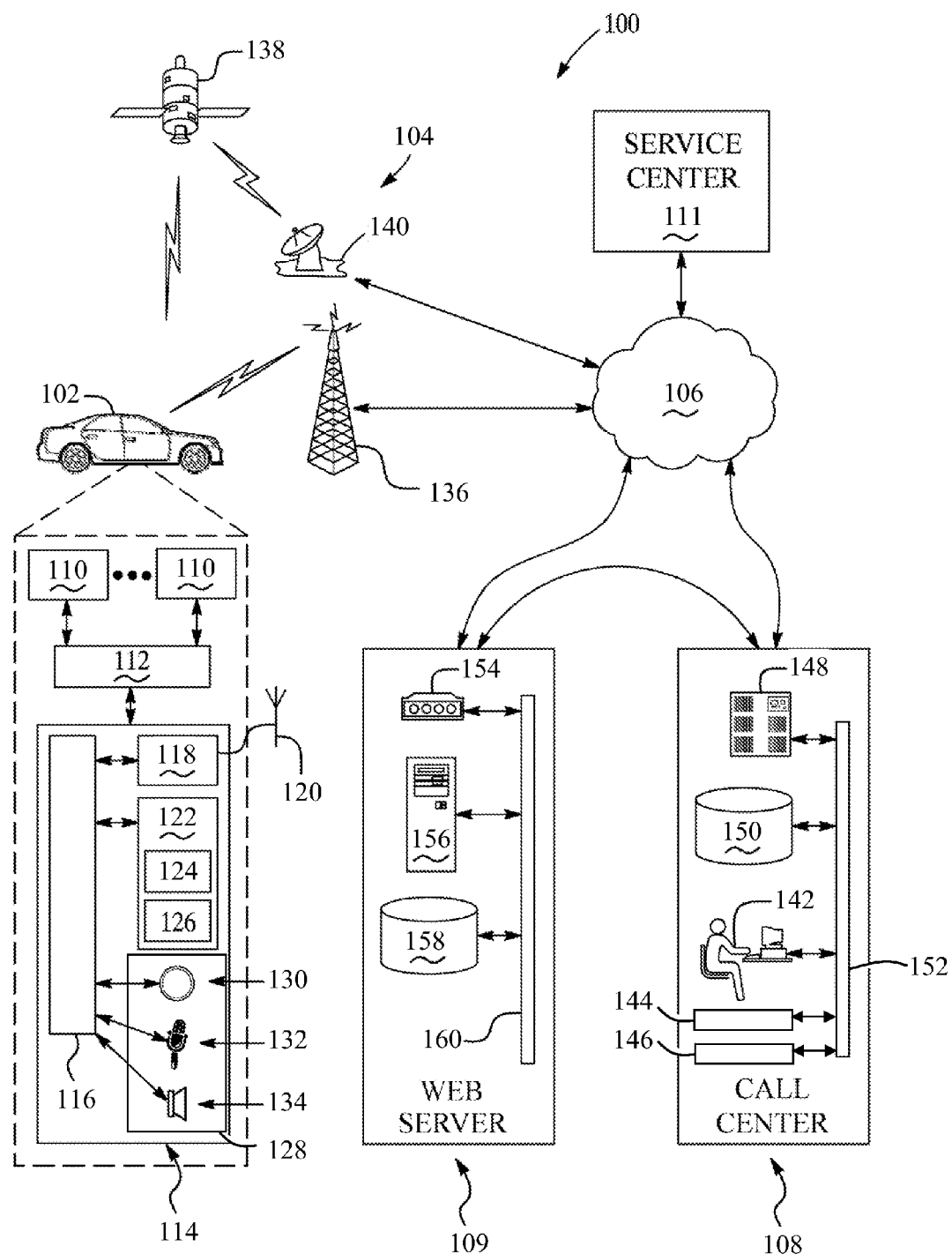
FIG. 1 is a block diagram depicting an example of a telematics system that can be used to implement exemplary methods of providing adaptive user guidance in an ASR.

An exemplary operating environment enabled with automated speech recognition (ASR) is illustrated in FIG. 1 and can be used to implement exemplary embodiments of methods of providing adaptive user guidance in an ASR. The methods can be particularly useful for adapting the amount of assistance to provide users based upon their interaction with the ASR. The methods can include the use of parameter values associated with the user's speech to determine the experience level of the user, and are discussed in detail further below in conjunction with FIGS. 2-6.

The methods can be carried out using any suitable ASR-enabled system. Preferably, however, the methods are carried out in conjunction with an ASR-enabled telematics system such as system 100, which can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with the aforementioned elements to provide services to the vehicle 102.

The exemplary telematics system 100 generally facilitates numerous services to the occupant(s) of the vehicle 102, including vehicle navigation, turn-by-turn driving directions, telephony including automated audio interaction with the occupant, emergency services, vehicle diagnostics, vehicle system updates, and ASR. For this purpose the telematics system 100 processes data and instructions as well as facilitates wireless voice and data transfer between hardware located on the vehicle 102 and hardware in the remote call center 108. For example, the telematics system 100 enables the vehicle occupant to initiate voice communication, for example, with the call center 108 or the service center 111. Also, the telematics system 100 enables electronic communication between the vehicle 102 and the web server 109 for various purposes such as transmitting and/or receiving information such as updated voice messages, email, news, or the like.

Motor Vehicle

The motor vehicle 102 is depicted in the illustrated embodiment as a passenger vehicle, and it will be appreciated that any other mobile vehicles including marine vehicles, aircraft, and other automobiles such as vans, trucks, etc., can be used without departing from the scope of the invention. Various electronic modules are located on the vehicle 102 and include one or more vehicle sub-systems or vehicle system modules (VSMs) 110, an on-board vehicle communication bus 112, and one or more vehicle telematics units 114 connected by the bus 112 to the VSM's 110.

VSM's

The VSM's 110 facilitate suitable on-board functions such as vehicle diagnostics, monitoring, control, reporting, and/or other functions. For example, the VSM's 110 can be used for controlling engine operation, monitoring and deploying air bags or other safety devices, and/or diagnosing vehicle systems via various vehicle sensors. The VSM's 110 broadly represent all of the subsystems throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSM's 110 and the telematics unit 114 and uses any suitable network communication configuration, such as a Controller Area Network (CAN), Media Oriented System Transport (MOST), Local Interconnect Network (LIN), Ethernet (10 base T, 100 base T), Local Area Network (LAN), ISO Standard 9141, ISO Standard 11898 for high-speed applications, ISO Standard 11519 for lower speed applications, SAE Standard J1850 for high-speed and lower speed applications, and/or the like.

Vehicle Telematics Unit

The vehicle telematics unit 114 facilitates communication and interactivity between the vehicle 102 or occupant thereof, and various remote locations including the call center 108, web server 109, and/or and service center 111. The telematics unit 114 interfaces with the various VSM's 110 via the vehicle communication bus 112. The telematics unit 114 is implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122 such as to carry out various functions of monitoring and processing data and communicating the telematics unit 114 with the VSM's 110, vehicle occupants, and remote locations. For example, the processor 116 executes one or more speech recognition programs and processes speech recognition data to carry out ASR. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 is any electronic storage device that provides computer-readable storage of data and programs for use by the processor 116. The memory 122 includes volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 are used for monitoring, recognizing, and/or recording voice inputs or speech from a vehicle occupant via the user interface 128. The database 126 is used to store voice message data, diagnostic trouble code data, or other diagnostic data. For example, the database 126 includes speech recognition databases such as acoustic models, vocabularies, grammars, and the like. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular satellite, or other wireless path, and facilitates both voice and data communications. For example, the wireless communications device 118 and associated antenna 120 transmits and receives voice and data to and from the wireless communication system 104 so that the telematics unit 114 communicates with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as CDMA or GSM, but could also utilize proprietary or other wireless technologies to communicate with the wireless communication system 104. The wireless communications device 118 can include additional or integrated functionality such as satellite communications software and hardware including a global positioning system (GPS) receiver. Such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and includes a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows a vehicle occupant to provide voice commands or other verbal input into the telematics unit 114, as well as voice communication with various remote locations via the communications device 122. Voice commands from the vehicle occupant are interpreted using a suitable analog-to-digital interface or digital signal processor such as a sound card (not shown) between the microphone 132 and the processor 116 and voice recognition programs and data stored within the memory 122.

The output devices include one or more speakers 134, a visual display device such as a liquid crystal or plasma screen (not shown), or any other types of output devices. The speaker(s) 134 enable the telematics unit 114 to communicate with the vehicle occupant through audible speech, signals, or audio files, and can be stand-alone speakers specifically dedicated for use with the telematics unit 114, or they can be part of the vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 includes an analog or digital cellular network 136, a wireless computer network such as a wide area network (not shown), or any other suitable wireless network used to transmit voice and data signals between the vehicle 102 and various remote locations such as the call center 108 and/or service center 111. In one embodiment, the cellular network 136 is implemented as a CDMA, GSM, or other cellular communication network that exchanges voice and data between the vehicle 102 and the second communication system 106. Additionally or alternatively, wireless communication can be carried out by satellite transmission using one or more satellites 138 to connect the vehicle 102 to the second communication system 106 via a central, ground-based satellite transceiver 140.

The second communication system 106 can be another wireless communication system or can be a land-based wired system such as a public switched telephone network (PTSN), an Internet Protocol (IP) network, an optical network, fiber network, or other cable network, and/or any combination of the aforementioned examples, any of which can be used for voice and/or data communication. Those skilled in the art will recognize that the communication systems 104, 106 can be implemented separately or can be combined as an integral system.

Call Center

The call center 108 includes one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer(s) used by the one or more advisors 142. For example, the servers 148 and databases 150 execute and store one or more speech recognition programs and speech recognition data to carry out ASR, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables a vehicle occupant to access websites and other content over the Internet, all from the vehicle using automated speech recognition technology and text-to-voice technology such as VoiceXML, or the like. For example, a vehicle occupant can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupant via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 can have a server application program that controls the exchange of data between the vehicle 102 and the database 158 via the communication systems 104, 106. The web server 109 can also communicate with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that a vehicle occupant can initiate a telephone call with a technician or service scheduler at the service center 111.

Exemplary ASR System

In general, a human user vocally interacts with an automatic speech recognition system for one or more fundamental purposes: to train the system to understand the user's voice; to store discrete speech such as a spoken nametag or a spoken control word like a numeral or keyword; or to use the recognition system to have the user's speech recognized and used for some useful end purpose such as voice dialing, menu navigation, transcription, or the like. In general, ASR extracts acoustic data from human speech, compares/contrasts the acoustic data to stored subword data, selects an appropriate subword which can be concatenated with other selected subwords, and outputs the corresponding subwords or words for post-processing such as dictation or transcription, address book dialing, storing to memory, training ASR models, or the like.

Figure 2:
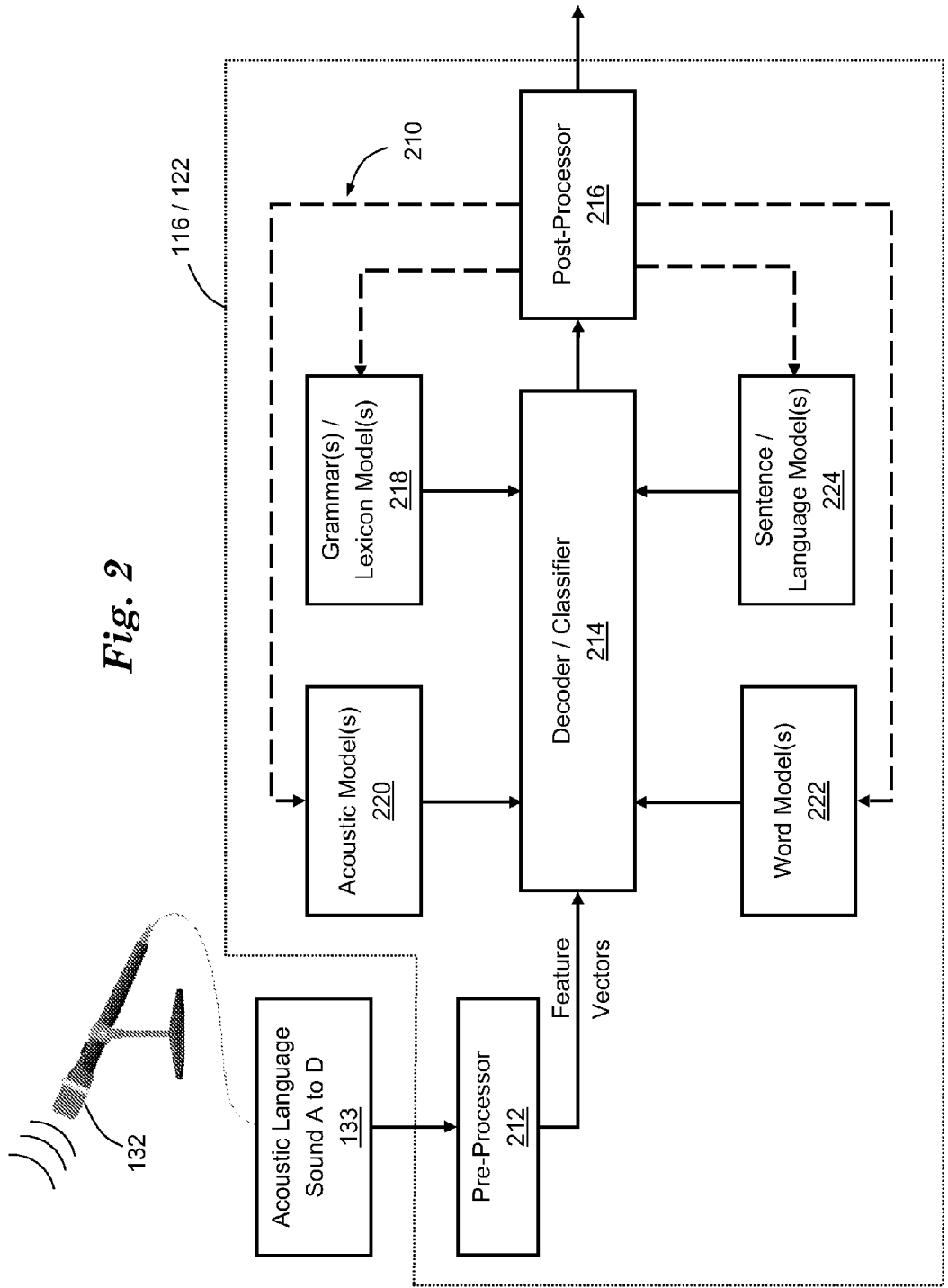
FIG. 2 is a block diagram illustrating an example ASR architecture that can be embedded within the telematics system of FIG. 1 and used to implement exemplary methods of providing adaptive user guidance in an ASR.

ASR systems are generally known to those skilled in the art, and FIG. 2 illustrates an exemplary specific architecture for an ASR system 210 to provide exemplary context for the method described herein below. The system 210 includes a device to receive speech such as the telematics microphone 132 and an acoustic interface 133 such as the telematics soundcard to digitize the speech into acoustic data. The architecture 210 also includes a memory such as the telematics memory 122 for storing the acoustic data and storing speech recognition software and databases, and a processor such as the telematics processor 116 to process the acoustic data. The processor 116 uses the speech recognition databases, a front-end processor or pre-processor software module 212 for parsing streams of acoustic data into parametric representations such as acoustic features, a decoder software module 214 for decoding the acoustic features to yield digital subword or word output data corresponding to the input speech inputs, and a post-processor software module 216 for using the output data from the decoder module 214 for any suitable purpose, including providing training feedback to other ASR models and providing assistance to the user.

One or more modules or models can be used as input to the decoder module 214. First, grammar or lexicon model(s) 218 provide rules governing which words or sub-words can logically follow other words or sub-words to form valid sentences. In a broad sense, a grammar also defines a universe of vocabulary the system expects at any given time in any given ASR mode. For example, if the system 210 is in a training mode for training commands, then an active grammar model 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) can define a universe of sentences the system expects at any given time in any given ASR mode and/or can provide rules governing which sentences can logically follow other sentences to form valid extended speech.

According to an alternative exemplary embodiment, some or all of the ASR system 210 can be resident on, and processed using, computing equipment in a location remote from the vehicle 102, such as the call center 108, web server 109, or the like. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software such as HMM decoders can be processed using processors of one of the servers 148 in the call center 108. In other words, the ASR system 210 can be distributed across the call center 108 and the vehicle 102 in any desired manner. Likewise, the methods described herein can be carried out entirely by the telematics unit 114 of the vehicle 102, by the computing equipment in the call center 108, or by any combination thereof.

Extracting Acoustic Data

First, acoustic data is extracted from human speech wherein a user speaks into the microphone 132, which converts the voice inputs into electrical signals and communicates such signals to the acoustic interface 133. A sound-responsive element in the microphone 132 captures the user's speech inputs as variations in air pressure and converts the voice inputs into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into streams of digital data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digitized speech data into discrete sequences of acoustic parameters. More specifically, the processor 116 executes the pre-processor module 212 to segment the digital speech data into overlapping phonetic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters, such as time-varying feature vectors, from within each frame. Voice inputs within the user's speech are represented as sequences of these feature vectors. For example, and as known to those skilled in the art, 39 feature vectors can be extracted and can include, for example, vocal pitch, energy profiles, or spectral attributes, and/or cepstral coefficients that can be obtained by performing Fourier transforms of the frames and decorrelating acoustic spectra using cosine transforms. Thus, an unknown test pattern of speech is a concatenation of related acoustic frames and corresponding parameters covering a particular duration of speech.

Decoding

Third, the processor executes the decoder module 214 to process incoming feature vectors of each test pattern. The decoder module 214 is also known as a recognition engine or classifier and uses stored known reference patterns of speech. Like the test patterns, the reference patterns are defined as a concatenation of related acoustic frames and corresponding parameters. The decoder module 214 compares and contrasts the acoustic feature vectors of a subword to be recognized with stored subword models or patterns, assesses the magnitude of the differences or similarities therebetween, and ultimately uses decision logic to choose a best matching subword from the models as the recognized subword. The best matching subword is typically that which corresponds to the stored known reference pattern that has the minimum dissimilarity to, or highest probability of being, the test pattern.

Recognized subwords can be used to construct words with help from the word models 222 and to construct sentences with the help from the language models 224. The decoder module 214 can use various techniques known to those skilled in the art to analyze and recognize subwords, including but not limited to dynamic time-warping classifiers, artificial intelligence techniques, neural networks, free phoneme recognizers, and probabilistic pattern matchers such as Hidden Markov Models (HMM).

The speech recognition decoder 214 processes the feature vectors using the appropriate acoustic models, grammars, and algorithms to generate an N-best list of nametag templates. As used herein, the term templates is interchangeable with models, waveforms, reference patterns, rich signal models, exemplars, hypotheses, or other types of references. A template can include a series of feature vectors representative of a word or subword and can be based on particular speakers, speaking styles, and audible environmental conditions. Those skilled in the art will recognize that templates can be generated by suitable template training of the ASR system and stored in memory. Those skilled in the art will also recognize that stored templates can be manipulated, wherein parameter values of the templates are adapted based on differences in speech input signals between template training and actual use of the ASR system. For example, a set of templates trained for one ASR user or certain acoustic conditions can be adapted and saved as another set of templates for a new ASR user or new acoustic conditions, based on a limited amount of training data from the new user or the new acoustic conditions. In other words, the templates are not necessarily fixed and can be processed during speech recognition.

Using the in-vocabulary grammar and any suitable decoder algorithm(s) and acoustic model(s), the processor accesses from memory several templates interpretive of the spoken command. For example, the processor can generate, and store to memory, a list of N-best vocabulary results or templates, along with corresponding parameter values. Exemplary parameter values can include confidence scores of each template in the N-best list of vocabulary and associated segment durations, likelihood scores, signal-to-noise (SNR) values, and/or the like. The N-best list of vocabulary can be ordered by descending magnitude of the parameter value(s). For example, the vocabulary template with the highest confidence score is the first best template, and so on.

Post-Processing

The post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212, or the like.

User Assistance

The post-processor software module 216 provides users with assistance as the user vocally interacts with an automatic speech recognition system. The post-processor software module 216 utilizes the output devices of the telematics user interface to provide audible information to the user. For example, the post-processor software module 216 can play an audible message to the user instructing the user how to request a function, such as dialing a phone number or programming a new contact in an address book. Other assistance can be provided to the user such as repeating commands back to the user so that the user can verify that the system correctly understood the user's command. In addition, the post-processor software module 216 can play audible messages to the user to inform the user of features and commands provided by the system.

Methods of Determining Experience Level

A method of providing adaptive user guidance in an ASR by determining the experience level of a user for an adaptive voice user interface is provided herein and can be carried out using the architecture of the ASR system 210 within the operating environment of the telematics system 100 described above. Those skilled in the art will also recognize that the method can be carried out using other ASR systems within other operating environments.

In general, a user can desire to speak a command to have the ASR 210 or its host device to take some action, such as place a telephone call, browse the Internet, or hear a list of names. For example, a user can say "directory" in order to hear a list of all stored addressees in the user's address list. The ASR 210 can recognize the speech as a command and further prompt the user to complete the desired action. For example, the ASR 210 can tell the user to "say the name of the person you wish to dial." The amount of prompting required to guide the user can depend upon the user's experience with the ASR 210 and his or her comfort level with the system. Moreover, the user can be more experienced with some actions than other actions.

Therefore, the ASR system 210 is able to process the user's speech and/or analyze/evaluate the user's history with the ASR to determine the user's experience level with the telematics system 100 and adjust the amount of guidance, such as prompting, to provide the user. In addition, other suitable guidance features can be adjusted to provide a more comfortable interaction between the user and the telematics system 100.

Figure 3:
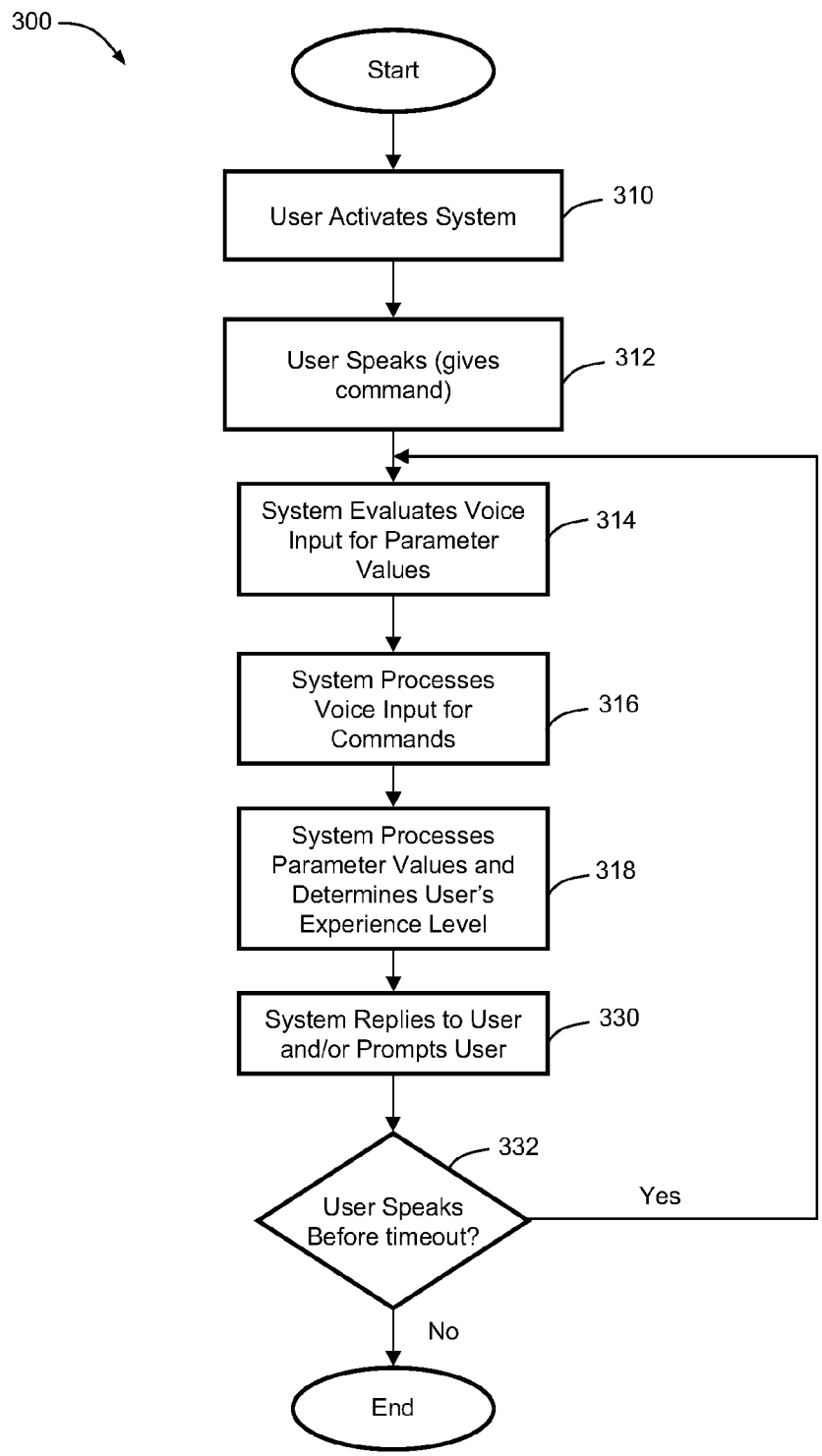
FIG. 3 is a flow chart of an embodiment of an exemplary method of providing adaptive user guidance in an ASR, which can be carried out using the telematics system and ASR architecture of FIGS. 1 and 2.

At step 310 shown in FIG. 3, a vehicle user starts interaction with the user interface of the telematics unit 114 through an activation, such as by depressing the user interface pushbutton 130. Other actions can also be used to begin the interaction, such as, for example, by speaking a voice command to the ASR 210 or driving the vehicle off a route set by the telematics unit 114 for navigation. Activation begins a session in which the user inputs voice commands that are interpreted by the telematics unit 114 while operating in speech recognition mode. Activation also starts a voice recognition window. The voice recognition window is a period of time the ASR 210 will listen for a voice command before timing out. Starting the voice recognition window begins a timer with a predetermined timeout. If the timeout expires before the ASR 210 receives a first voice command from the user, the system can deactivate and the user will have to reactivate the system before providing a command. Timeouts occurring after the user's first voice command can cause the ASR 210 to prompt the user for another command. Additional timeouts can cause the ASR 210 to deactivate. Using the speaker 134, the telematics unit 114 acknowledges the activation by playing a sound or providing a verbal request for a command from the user or occupant.

At step 312, the user provides a voice input to the telematics unit 114 to request an action from the telematics unit 114. For example, the telematics unit 114 can receive an audible command from the user such as "Phone Home" from an occupant via the user interface microphone 132. The ASR-enabled telematics unit 114 receives the command from the user, such as through the user interface microphone 132.

At step 314, the pre-processor 212 extracts speech parameters from the voice input, such as acoustic feature vectors. The parameters can include any characteristics of the user's speech that can be helpful in evaluating the experience level of the user in using the telematics system 100. The parameters can be extracted through any suitable algorithms and methods. The parameters can include, for example, speech volume, vocal pitch, vocal speed, energy profiles, steadiness, intonation, and the like. Moreover, other parameters can be extracted through other algorithms, methods, or components within the ASR 210. These include, delay (how long the user took to begin speaking after the voice recognize window was initialized), the number of expired timeouts, and any other suitable parameters.

At step 316, the command is further processed to determine what command, if any, was spoken by the user. Here, the user's speech is processed by the telematics unit 114 using any suitable decoder module to recognize words, or subwords such as phonemes, that define a spoken command. As used herein, the term command includes a single command and/or one or more command templates. Those skilled in the art recognize that command templates are alternative interpretations or representations of a given command. During this step, further parameters can be extracted from the voice input or otherwise calculated. For example, the ASR 210 can determine whether non-telegraphic words are spoken (i.e. extra words spoken that are not part of a command). Moreover, the ASR 210 can determine a confidence level of the ASR in recognizing the commands.

At step 318, the ASR 210 processes values of the parameters and determines the experience level of the user. FIG. 4 illustrates one exemplary implementation of a method for processing the parameter values and determining the experience level of the user. At step 320, the post-processor calculates a sum of relevant parameter values to create a score. The specific process for calculating the sum can vary to meet the needs of the particular system. The sum or score can be calculated by adding together various parameter values, but not all parameter values need to be used in the sum calculation. In addition, and the parameter values that are used can vary based upon the needs and goals of the system. For example, parameters of a similar type may be added together to calculate the score. Moreover, the specific units of particular parameter values can vary. Weighting can be used in the calculation to compensate for discrepancies in units. In addition, the weighting used can vary. The experience level of a user can be subjective and therefore more or less weight can be applied to certain parameters while other parameters can be ignored altogether.

At step 322, the parameter values, calculated into a sum or score, are compared to a threshold or set of thresholds to determine the experience level of the user. In one implementation, a number of thresholds can be defined to classify the user's experience level into predetermined levels of experience such as novice, normal, expert, etc. The thresholds define the range of sums applicable to each level. For example, a score falling below the lowest threshold can be classified as a novice user. A score higher than the lowest threshold, but lower than the next threshold can be classified as a normal user. A score higher than the next threshold can be classified as an expert.

At step 330 shown in FIG. 3, the telematics unit 114 replies to the user with an appropriate response based upon the calculated user experience level. The experience lever of the user determines how the telematics unit 114 interacts with the user. For instance, the voice recognition window is set appropriately based upon the determined experience level. Expert users can have a shorter voice recognition window than novice users because expert users are assumed to be more familiar with the appropriate commands and thus able to voice those commands more quickly. The ASR 210 can set the voice recognition window based upon the determined speed of the user's speech (calculated from one or more of the parameters such as vocal speech), however, in addition to the determined user experience level.

The appropriate reply to the user's command is also determined by the user's experience level. Generally, less experienced users will require more detailed prompting and more experienced user will require less detailed prompting, if any. For example, a novice user trying to dial a phone number using voice commands can require confirmation responses to their commands and very detailed prompting, such as instructions to guide the user to complete the request for an action. In addition, an automated help message can also be played to provide further assistance to the user if the user appears very inexperienced. An example of the telematics unit 114 prompting a novice user is provided:

User: [activates ASR 210—voice recognition window started]

User: "Ummmm . . . [pause] . . . dial?"

System: [determines user to be a novice] "Please say the phone number you wish to dial. Please say the entire number to dial all at once like: 555-1212."

System: [providing additional help] "But if you want to call a name tag from your phone book, please say the 'call' command."

User: "okay . . . 555-3654."

System: "Dialing 555-3654. Is this correct?"

In the example above, the extra words, the pause, and the intonation (based on, for example, non-telegraphic speech and pause) all indicated that the user had little experience with dialing a phone number using the telematics system 100. The ASR 210 recognized the lack of experience and provided a very detailed response to the user's command. In addition, the ASR 210 provided help to inform the user of another similar command that the customer can have preferred to use, but can not have been familiar with. In addition, the ASR 210 read back the number requested and asked the user to confirm that it was correct. The ASR 210 can ask for confirmation that its interpretation is correct if the user's experience is very low and/or the confidence level parameter has a low value. The confidence level parameter indicates the degree to which the ASR 210 has confidence it properly recognized the command.

An example of a user estimated to have a normal experience level is provided:

User: [activates system—voice recognition window started] "Dial please."

System: [determines user to be about average] "Please say the phone number you wish to dial."

User: "555-3654."

System: "Dialing 555-3654."

In this example, the ASR 210 recognized the user as a normal user. The response to the "dial" command provided some guidance, but was not as extensive as for the novice. Also, no additional help was provided. Moreover, the ASR 210 did not request that the user confirm the number dialed by the system.

An example with an expert user is provided:

User: [activates system—voice recognition window started] "Dial."

System: [determines user to be an expert] "Phone number."

User: "555-3654."

System: "Dialing."

In this example, the ASR 210 recognized the user as an expert and provided minimal responses and prompting. To further speed up the ASR's 210 interaction with an expert user, the system can alternatively provide a simple audible confirmation to the user, such as a beep, after each user command. The beep confirms to the user that the ASR 210 recognized the command.

The experience level of the user can be determined from a single command as shown above. Moreover, the ASR 210 can reevaluate the experience level of the user after each command as shown below:

User: [activates system—voice recognition window started] "Dial please."

System: [determines user to be about average] "Phone number."

User: "Ummm . . . [pause] . . . John Smith."

System: [determines user to be a novice] "Please say the phone number you wish to dial."

System: [providing additional help] "But if you want to call a name tag from your phone book, please say the 'call' command."

In the example above, the ASR 210 first recognized the user as a user of about average experience. But after the user paused and provided a name instead of a phone number, the ASR 210 recognized the user as having little experience. The ASR 210 provided a more detailed response and also provided help to guide the user. The ASR 210 can act in a similar manner if the user provides a command, but then allows the ASR 210 to timeout prior to responding after the prompt. The ASR 210 can recognize a lower experience level for the user and provide a more detailed prompt to assist the user.

In step 332, the ASR 210 waits for another voice input from the user. If the user fails to provide a voice input prior to a timeout of the voice recognition window, then the process ends. But if the user provides another voice input prior to a timeout, then the method jumps back to step 314 to process the voice input.

Another implementation 318' of step 318 is shown in FIG. 5 where the user's experience level is determined by using individual parameter levels to indicate a high or low level of user experience and determining the number of parameters of each type. Individual parameters can indicate the experience level of the user. For example, a parameter value for measuring intonation can indicate a low level of experience in a user. An intonation parameter value indicating that the user gave a command in the form of a question, can indicate that the user was unsure if the command was proper, and thus can indicate a relatively low level of experience. In contrast, an intonation parameter value indicating a firm command can indicate a relatively high level of experience. In another example, speech that includes only commands without extra words can be used to indicate a high level of experience.

In step 420 shown in FIG. 5, individual parameter values are compared to a specific threshold or thresholds corresponding to expertise levels. For example, the speech volume parameter can be broken into any number of expertise levels such as novice, normal, expert or the like by setting volume threshold levels for each experience level. A speech volume under the lowest threshold would fall into the novice experience level. A speech volume above the lowest threshold but below the next threshold would fall into the normal experience level, and so on. In step 422, the individual parameters are classified into experience levels based upon the threshold comparison.

In step 424, the number of parameters falling into each experience level are compared to one another to determine the overall experience level of the user. For example, the sum used to determine the user's experience can be calculated by comparing the number of parameters indicating a high level of expertise with the number of parameters indicating a low level of expertise. There are many possible ways to calculate the sum once the parameters are classified into a category. For example, the experience level that appears most often from the parameters can be used as the user's overall experience level. As another example, the experience levels can each contain a point value such as 1 for novice, 2 for normal, 3 for expert, etc. Each parameter would receive the corresponding number of points based upon the experience level that it indicates. All the points would be added up and divided by the number of parameters used. The experience level with the closest point value to the result would be determined to be the overall experience level of the user.

FIG. 6 shows yet another example of a possible implementation 318" of step 318. Although the experience level of the user can be determined from a single command or voice input and can be re-determined after each voice input, a history can be kept to further aid the experience level determination. For example, a running average can be used to determine experience level. At step 520, the post-processor calculates a sum of relevant parameter values to create a score similar to the step described at step 320. The sum or score can be calculated by adding to together various parameter values, but not all parameter values have to be used in the sum calculation. In addition, the parameter values that are used can vary based upon the goals of the system. Weighting also can be used in the calculation to compensate for discrepancies in units.

At step 522, a most recent score is averaged with a predetermined number of recent scores to determine a result. The number of scores used in the average can vary depending upon system goals. Moreover, the number of voice inputs used can vary based upon the user's experience level. For example, the ASR 210 can average the three most recent voice inputs for a user previously determined to be a novice, but average the five most recent voice inputs for a user previously determined to be an expert.

At step 524, the result is compared to at least one threshold to determine the user's experience level. A number of thresholds can be defined to classify the user's experience into predetermined experience levels such as novice, normal, expert, and the like. The thresholds define the range of scores applicable to each level.

Additional uses for histories are also possible. Specifically, the commands recognized by the ASR 210 can be grouped according to their related actions. For example, commands related to placing phone calls can be placed in one group, and commands related to vehicle navigation can be placed in another group. The experience level of the user can then be determined on a group by group basis. A user can be highly experienced with one group of commands, but relatively inexperienced with another group. As such, the history can distinguish between the experience levels of the various groups from one another. For example, a rolling average can be calculated for commands used from a phone call group independently of a rolling average for commands used from a navigation group. Using a rolling average for different groups of commands can allow the telematics system 100 to provide a comfortable level of assistance for users that is relatively stable but still conforms to the user's level of experience with different aspects of the system.

Likewise, the ASR 210 can use a history for individual commands. Tracking a history of command usage can allow the ASR 210 to recognize how often commands are used. A counter can be used to track the number of times a command is given by the user as a parameter associated with the user's speech to help determine the experience level of the user. The ASR 210 can assume that the more a command is used, the more experience the user has with the command. In contrast, if a command is used for the first time, the ASR 210 can decide to provide additional prompting in response to it. In addition, the ASR 210 can suggest to the user commands that have never been used. The ASR 210 can provide the suggestion during dead time. Dead time is the period of time when the ASR 210 is activated and performing a function, but little or no audible interaction takes place between the user and the system. For example, the dead time can occur while the telematics unit 114 processes a user's credit card or downloads navigation information. During the dead time, the telematics unit 114 can explain to the user that a particular action can be performed by the telematics system 100 and provide the command to order the action. For example, the telematics unit 114 can say "to call a contact in your phone book, say the word 'call'" to a user that has never used the "call" command.

The ASR 210 can identify individual users and maintain a history for those users. The ASR 210 can identify users by any number of suitable methods such as, for example, voice recognition to enable the system 100 to identify a specific user by the user's voice, identification chips, such as an RFID chip, carried by the user's car keys, the activation of the user's key fob, selection of a user through user interaction with a user interface on the vehicle 12, and the like. The histories for the users can include experience levels for individual commands, groups of commands, or all commands for the telematics system 100. The history allows the ASR 210 to default to an experience level for an identified user when the ASR 210 is activated and add new scores to the history as the user interacts with the telematics system 100.

It is to be understood that the foregoing description is not a definition of the invention itself, but is a description of one or more preferred exemplary embodiments of the invention. The invention is not limited to the particular embodiment(s) disclosed herein, but rather is defined solely by the claims below.

Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A speech recognition method comprising the steps of:
   (a) receiving input speech from a user;
   (b) processing said input speech to obtain at least one parameter value; and
   (c) determining the user's level of experience with using automatic speech recognition, using the at least one parameter value.

2. The speech recognition method of claim 1, wherein step (c) further comprises calculating a score using said at least one parameter value.

3. The speech recognition method of claim 2, wherein step (c) further comprises calculating said score from a sum of said at least one parameter value.

4. The speech recognition method of claim 3, wherein said sum is a weighted sum of said at least one parameter value.

5. The speech recognition method of claim 1, wherein step (c) further comprises comparing said at least one parameter value to at least one threshold value.

6. The speech recognition method of claim 1, further comprising the step of maintaining a history of usage of automatic speech recognition by the user for determining said user's level of experience.

7. The speech recognition method of claim 1, wherein step (c) further comprises determining said user's level of experience from at least one or more predetermined levels of experience including a novice user level.

8. The speech recognition method of claim 1, further comprising the step of setting a voice recognition window based upon the determined user's level of experience, including setting the window to be shorter for expert users and longer for novice users.

9. The speech recognition method of claim 1, wherein said at least one parameter value includes at least one of: speech volume, vocal pitch, vocal speed, energy profiles, steadiness, or intonation.

10. A speech recognition method for a speech recognition system comprising the steps of:
    (a) receiving input speech from a user;
    (b) processing said input speech to obtain at least one parameter value;
    (c) determining the user's level of experience with using automatic speech recognition, using the at least one parameter value; and
    (d) adjusting an amount of prompting provided to the user based upon said user's level of experience to assist the user in delivering speech commands to the system wherein the adjusting includes providing users having less experience with automatic speech recognition with prompting that is more detailed than that provided for users having more experience with automatic speech recognition.

11. The speech recognition method of claim 10, wherein step (d) further comprises providing the user with commands recognized by the system depending on the user's level of experience with using automatic speech recognition.

12. The speech recognition method of claim 10, wherein step (d) further comprises providing the user with instructions to guide the user depending on the user's level of experience with using automatic speech recognition.

13. The speech recognition method of claim 10, further comprising the step of suggesting commands to the user during dead time.

14. The speech recognition method of claim 10, further comprising the step of setting a voice recognition window based upon the determined user's level of experience.

15. The speech recognition method of claim 10, wherein step (d) includes providing at least one of confirmation responses to user commands, instructions to guide the user to complete a request for an action, or playing an automated help message.

16. The speech recognition method of claim 10 wherein step (c) further comprises calculating a score from a weighted sum of said at least one parameter value.

17. The speech recognition method of claim 10, wherein step (b) further comprises comparing said at least one parameter value to at least one threshold value, wherein said at least one parameter is speech volume, and when said speech volume value is below said at least one threshold value, the user's level of experience with automatic speech recognition is determined to be at a novice user level.

18. The speech recognition method of claim 10, further comprising the step of maintaining a history of usage of automatic speech recognition by the user for determining said user's level of experience.

19. The speech recognition method of claim 10, further comprising the step of determining the user's experience level with a group of commands.

20. A communications system located on a vehicle, comprising:
a speech receiving device to receive speech from a user;
an acoustic interface to digitize the speech into acoustic data;
a memory for storing the acoustic data; and
a processor for processing the acoustic data;
said speech receiving device, said memory, and said processor providing automated speech recognition for the acoustic data;
wherein said processor processes said acoustic data to obtain at least one parameter value, determines the user's level of experience with using automatic speech recognition from at least one of said parameter values, and adjusts an amount of prompting provided to the user based upon said user's level of experience to assist the user in delivering speech commands to the system.

21. The speech recognition method of claim 1, wherein said at least one parameter value includes intonation, and further wherein an intonation parameter value indicating that the user gave a command in the form of a question is indicative that the user's level of experience is relatively low, whereas an intonation parameter value indicating a firm command is indicative that user's level of experience is relatively high.

22. The speech recognition method of claim 1, wherein the user's level of experience is determined to be high when the user's input speech includes only commands without extra words.

23. The speech recognition method of claim 1, further comprising the step of determining the user's experience level with different groups of commands.

24. The speech recognition method of claim 1, further comprising the step of maintaining a history of usage of automatic speech recognition by the user for determining said user's level of experience, and wherein step (d) includes tracking the number of times a command is given by the user as said at least one parameter value.

25. The speech recognition method of claim 24, further comprising the step of adjusting the amount of prompting provided to the user, if it is determined that the user has given the command for the first time.

26. The speech recognition method of claim 1, further comprising the steps of:
identifying individual users of automatic speech recognition; and
maintaining histories for the users, including the users' levels of experience with automatic speech recognition commands.

* * * * *